July 30, 1940.  R. M. SOMERS  2,209,833
PHONOGRAPH RECORD SHAVING MACHINE
Original Filed Oct. 1, 1938  3 Sheets-Sheet 2

INVENTOR
Richard M. Somers
BY Henry Lanahan
ATTORNEY

Patented July 30, 1940

2,209,833

UNITED STATES PATENT OFFICE 2,209,833

PHONOGRAPH RECORD SHAVING MACHINE

Richard M. Somers, West Orange, N. J., assignor to Thomas A. Edison, Incorporated, West Orange, N. J., a corporation of New Jersey Application October 1, 1938, Serial No. 232,766
Renewed August 9, 1939

32 Claims. (Cl. 82—1.1)

This invention relates to phonograph record shaving machines, and more particularly to improvements in such record shaving machines as are employed for resurfacing records of the type intended principally for use with dictating machines.

A phonograph record shaving machine typically comprises means for supporting and rotating a record, a carriage movable across the record coincidentally with the rotation of the record, and a resurfacing tool on the carriage movable into and out of operative, or record engaging, position. In the use of the machine the resurfacing tool is set into operative position with respect to the record, and the carriage is moved into an initial position. The machine may then be started or put into operation to cause record rotation and movement of the carriage across the record. As the carriage is so moved the resurfacing tool is carried through its operative range of movement to cause a surface layer of the record to be cut away. After the resurfacing tool has traversed the record the carriage is moved slightly onwardly into its terminal position, the resurfacing tool thus being moved through an inoperative range of movement to render the tool suitably free of the record. The machine may then be stopped and the record removed.

In the removal of a record from the machine, as for example after the completion of a resurfacing of the record, it is important that care be taken to avoid a scraping of the record against the resurfacing tool. Such scraping, or damage to the record, may be avoided by the provision of means for preventing the removal of a record from the machine except when the carriage is in a predetermined position wherein the resurfacing tool is free from contact with the record being removed—such position being, for example, the terminal position of the carriage. With the provision of such means there may very desirably be provided other related means for facilitating the use of the machine, as is hereinafter described.

It is an object of my invention to prevent damage to the record as the record is mounted on or removed from the machine.

It is another object of my invention to prevent the removal of a record from the machine when the carriage is in other than a predetermined position with respect to the record.

It is another object to prevent the removal of a record from the machine except when the carriage is in its terminal position.

Another object is to provide suitably controlled means for obstructing the movement of a record from a fully mounted position with respect to the record supporting means.

A further object is to render such obstructing means inoperative when the carriage is in its terminal position.

Another object is to provide a record ejecting means which is rendered inoperative except when the carriage is in other than a predetermined, or terminal, position.

It is another object of my invention to lock the carriage in a predetermined, or terminal, position when the parts of the machine are in a position permitting the removal of a record.

It is another object of my invention to move the resurfacing tool out of operative position as an incident of mounting a record on the machine.

It is another object of my invention to provide improved tool setting means by which the tool may be set into operative position while the tool is off the record—as, for example, when the carriage is in its terminal position.

Other and allied objects will more fully appear from the following description and the appended claims.

In the description of my invention, reference is had to the accompanying drawings, of which.

Figure 1:
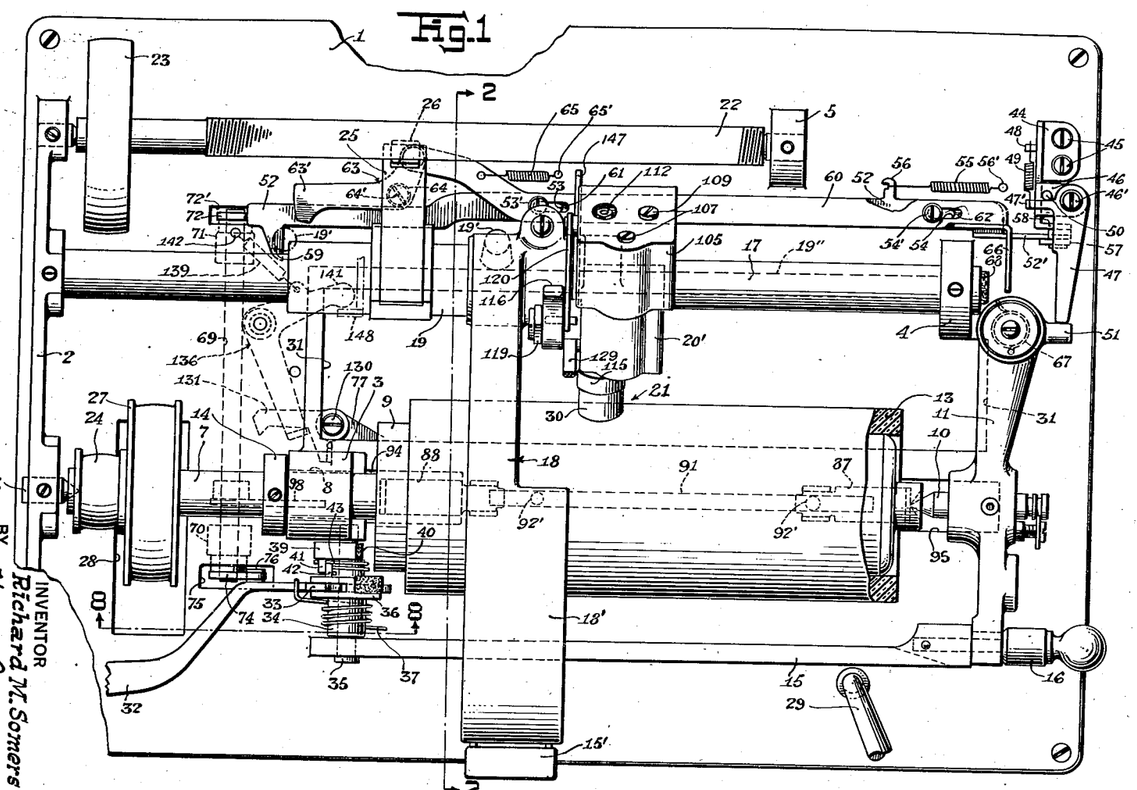
Figure 1 is a top plan view of a phonograph record shaving machine to which my invention has been applied.
Figure 2:
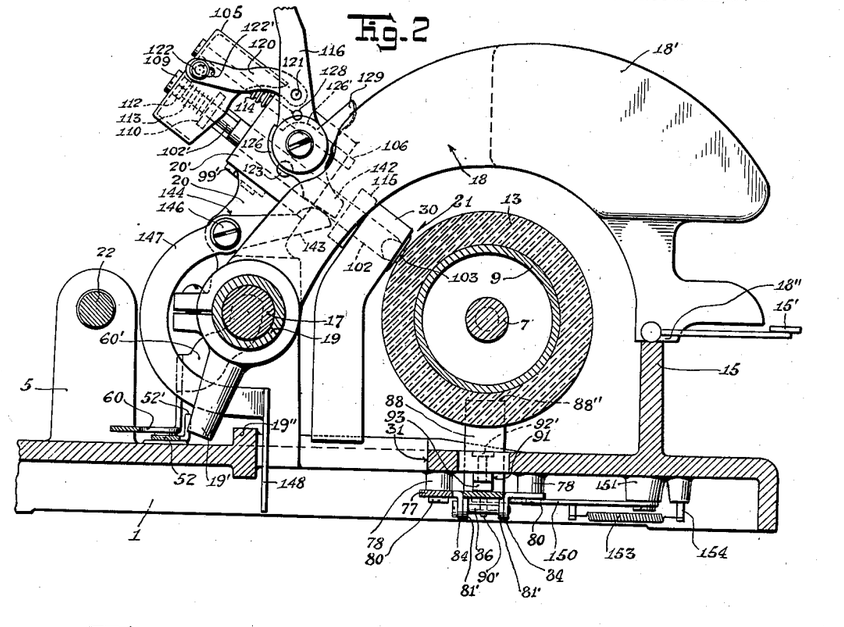
Fig. 2 is a vertical cross sectional view taken along the line 2—2 of Fig. 1.

Reference being had to Figs. 1 and 2 there will be seen a form of phonograph record shaving machine in which my invention has been incorporated. This machine may comprise a base plate 1 having a left-hand standard 2, an intermediate standard 3, and right-hand standards 4 and 5. The left-hand standard 2 carries a conically pointed stud 6 engaging a recess in the end of a shaft 7. This shaft extends rightwardly through an oversized hole 8 in the intermediate standard 3, carries a mandrel 9 rightwardly of the standard 3, and is supported at its right end by an adjustable and conically pointed stud 10 engaging a recess in the end of the shaft. The stud 10 is carried by an end-gate 11 which is pivoted on a boss 12 (see Fig. 6) so that the end-gate may swing open, in a counterclockwise direction, to free the right end of the mandrel. When the end-gate 11 is open, a cylindrical record 13 may be slidingly mounted on the mandrel 9, the mandrel and record commonly being slightly tapered so that the record may fit tightly on the mandrel in an operative position. While the end-gate 11 is open, the shaft 7 is intermediately supported by means of the intermediate standard 3, the mandrel being permitted to fall through a slight distance by reason of the oversized hole 8. In order to retain the shaft 7 in engagement with the stud 6 during the opening of the end-gate, the shaft is provided with a collar 14 which is arranged to abut against the standard 3 to limit rightward movement of the shaft. As the end-gate is closed the forward end thereof impinges against the right end of a guide rail 15 which is disposed in parallel relation to the axis of the shaft 7; the end-gate may be retained in a closed position as by a latch 16.

Supported by the standards 2 and 4, in parallel relation to the axis of shaft 7, is a rod 17 on which there is slidably and tiltably mounted a carriage 18. This carriage is provided with a sleeve 19 which embraces the rod, and with a gooseneck arm 18' which extends forwardly over the record 13 and then downwardly to form a shoe 18", this shoe being slidably supported by the guide rail 15; the carriage is also provided with a forward extension 20, disposed rightwardly of the carriage arm 18', and terminating in a head 20' which supports a resurfacing tool 21. The carriage may be moved across the record 13, coincidentally with a rotation of the record by means of a feed screw 22, which is supported for rotation by the standards 2 and 5 and which is provided with a pulley 23 arranged to be coupled, as by a belt, to a pulley 24 on the shaft 7. Secured to the carriage sleeve 19, and extending rearwardly therefrom, is a resilient arm 25 which is provided with a feed nut 26. When the carriage is in an operative position, as when the carriage shoe 18" is resting on the guide rail 15, the feed nut 26 engages the underside of the feed screw 22. Thus, a rotation of the record 13 will cause a rotation of the feed screw 22 to move the carriage 18 across the record coincidentally with the record rotation, this movement of the carriage commonly being in a left hand direction.

For effecting rotation of the record and a movement of the carriage across the record, there may be provided a suitable motor (not shown); the motor may be aptly located beneath the base plate 1 and coupled, as by a drive belt, to a pulley 27 on the shaft 7, the base plate 1 being provided with a suitable opening 28 through which the drive belt may pass. For controlling the operation of the motor there may be provided a suitable switch (not shown) which may be operated as by a control lever 29 pivoted on the base plate 1 in the front right-end portion thereof.

In the use of the machine, a cylindrical record is first mounted on the mandrel 9 and the end-gate 11 is then closed. The resurfacing tool 21 is then set into operative position with respect to the newly mounted record and the carriage 18 is moved rightwardly into its initial position, wherein the resurfacing tool is to the right of the record. It will be seen that such return of the carriage may be suitably effected by first raising the carriage arm 18' so as to move the feed nut 26 downwardly out of engagement with the feed screw 22 and the resurfacing tool 21 out of engagement with the record 13, such raising being limited, however, by the abutment of a rearwardly and downwardly extending arm 19' on the carriage with a suitable stop 19" on the base plate 1. While the carriage is so raised it is free to be moved rightwardly into its initial position. When the carriage reaches its initial postion the carriage arm 18' may be lowered to rest on the guide rail 15 so as to re-engage the feed nut with the feed screw and to lower the resurfacing tool into operative position with respect to the record. Upon starting the machine, as by the control lever 29, the record will be set in rotation and the carriage will be moved leftwardly, thereby causing the resurfacing tool to be carried through its operative range of movement to cause a surface layer of the record to be cut away. During such resurfacing operation the cut-away layer, commonly known as the shaving chips, may be directed downwardly, as by a chip chute 30, through an opening 31 in the base plate 1 and into a suitable container (not shown). After the resurfacing tool 21 has moved through a slight inoperative range of movement beyond the record, the carriage 18 having moved into its terminal position, the machine may be stopped. If the record surface is found to be insufficiently smooth, a finishing cut means 15', well known in the art, may be operated to advance the tool a slight distance towards the record and a second cut may then be taken. The end-gate 11 may then be opened and the record removed from the mandrel 9.

Figures 7, 8, 9:
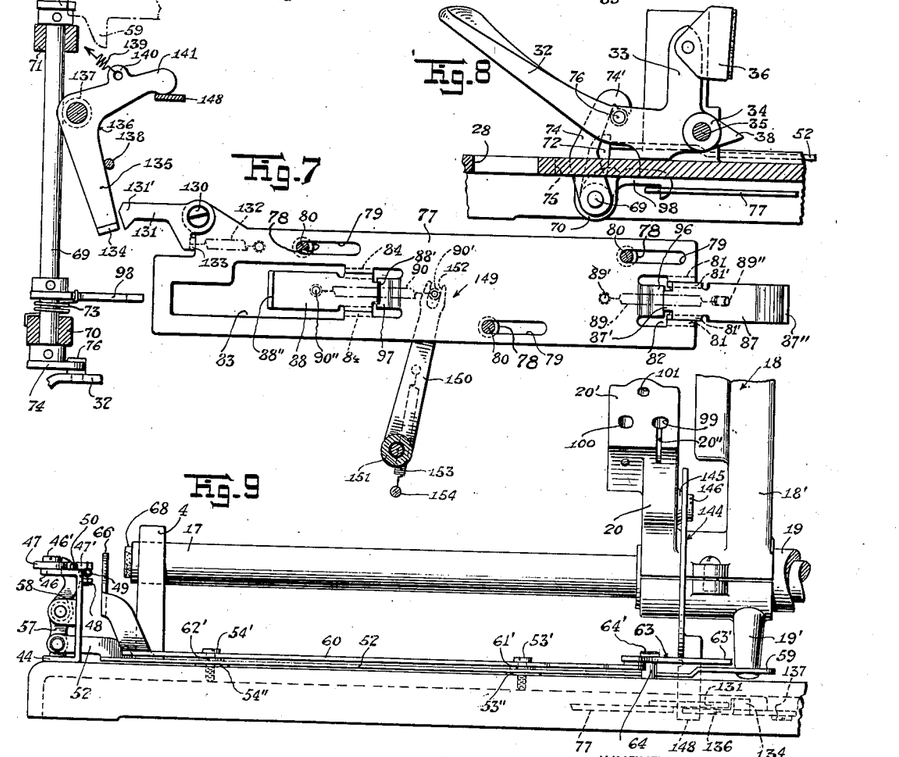
Fig. 7 is a top plan view of the means just mentioned, showing also locking means therefor and for a record ejector.
Fig. 8 is a vertical cross sectional view taken along the line 8—8 of Fig. 1.
Fig. 9 is a rear elevational view of parts of the machine of Fig. 1, showing in particular the carriage locking means and the means operatively connecting the carriage with the end-gate lock, the end-gate being not shown.

For removing a record from the mandrel 9 there may be provided a record ejector suitably comprising an operating arm 32 and a record ejecting arm 33 having a common hub 34 which is pivoted on a rod 35 supported at its front and back ends by the guide rail 15 and intermediate standard 3 respectively. Pivotally connected to the ejecting arm 33 is a shoe 36 which is positioned slightly to the left of the adjacent end of a mounted record when the record ejector is in an unoperated position, as shown in Figs. 1 and 8. The record ejector is normally maintained in such unoperated position by means of a coil spring 37 urging the operating lever 32 downwardly, in a counterclockwise direction, against the base plate 1. In operating the record ejector, the arm 32 is swung in a clockwise direction so as to bring the record engaging shoe 36 into contact with the record to push the record off the mandrel, the operated position of the record ejector being determined by the abutment of an arm 38 on the hub 34 with the base plate 1, as shown in Fig. 8.

There is also commonly provided a mandrel brake which is operated incidental to the act of operating the record ejector. The mandrel brake may comprise an arm 39, pivoted on the rear end portion of the rod 35 and carrying at its upper end a shoe 40, commonly made of felt, which is brought into contact with the adjacent end of the mandrel 9 to retard the rotation of the mandrel by friction. In order to couple the brake arm 39 with the record ejecting arm 33, these arms are provided with respective forwardly and rearwardly extending pins 41 and 42 which are resiliently maintained in contact with one another by means of a spring 43 coiled about the hub 34 and hooked at its ends about the respective pins. Thus the brake arm 39 will be yieldably moved rightwardly so as to urge the shoe 40 against the left end of the mandrel 9 whenever the record ejector is operated, as in the removal of a record from the mandrel.

In accordance with my invention I provide means for preventing damage to the record such as may be caused by a scraping of the tool thereon during the removal of the record from the machine. These means are arranged to prevent the removal of a record from the machine while the carriage is in other than a predetermined position with respect to the record. This predetermined position of the carriage may be any desired position, or any one of several positions, of the carriage in which the resurfacing tool, although in a set position, is suitably free of the record. By way of example, such predetermined position may be an upwardly tilted position of the carriage, or the aforementioned terminal position of the carriage; I find, however, that the terminal position is a particularly desirable one.

In the removal of a record from the machine, the first operation normally performed is the opening of the end-gate 11. By locking the end-gate in a closed position, the removal of a record from the machine is of course prevented; but it will be seen that the operator may still dislodge the record from an operative or fully mounted position on the mandrel through inadvertence or mistake, either by manual means or by means of the record ejector. In practice, a locking of the ejector may be sufficient to prevent any such improper dislodgment of the record from the mandrel, since the only convenient and proper way of removing a record from the machine is by the use of the ejector. If no locking means be provided for the ejector, the record may be prevented from being improperly dislodged from an operative position on the mandrel by the interposition of suitable obstructing means in the path of record removal from the mandrel. Since the end-gate is normally opened before the ejector is operated, a suitable locking of the end-gate may in practice be considered sufficient to forestall any attempt at an improper removal of a record from the machine. In order, however, to positively prevent any improper removal of a record from the machine, I have chosen to employ means for locking the end-gate in a closed position, means for locking the ejector in an unoperated position, and means for locking the record in an operative position on the mandrel, all of these means being arranged to be inoperative when the carriage is in its terminal position. It will of course be understood that I may employ, however, any sub-combination of these locking means, or any one of them, as desired.

Figure 6:
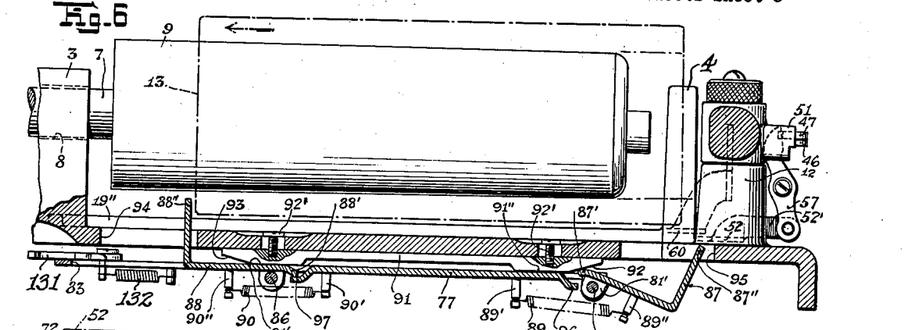
Fig. 6 is a vertical view, partly in section, of a portion of the machine of Figure 1 principally showing a means automatically operated incidental to the mounting or removal of a record with respect to the mandrel, the record being shown in dash-dot lines in a partially mounted position.

The means for locking the end-gate 11 in a closed position while the carriage is in other than its terminal position may be of a form best seen in Figs. 1, 6 and 9. These means comprise an upstanding bracket 44 secured to the base plate 1 in the right rearward portion thereof by the screws 45. At the top of the bracket there is provided a turned-over ear 46 to which there is pivotally connected, as by a shoulder screw 46', a forwardly extending locking arm 47. This arm is provided with a short side arm 47'; connected between the short arm 47' and a pin 48 on the bracket 44 is a tension spring 49 which urges the locking arm 47 leftwardly into its normal operative position, shown in Fig. 1, this position being defined by a contact of the short arm 47' with a short pin 50 on the ear 46. When the arm 47 is in such operative or locking position, its forward end contacts a boss 51, projecting rightwardly from the hub of the end-gate 11, to prevent opening of the end-gate. As the carriage 18 is moved into its terminal position, however, the arm 47 is moved out of its operative position to permit an opening of the end-gate.

The means for so moving the locking arm 47 out of its operative position may comprise a long laterally extending bar 52 which is disposed slightly above the base plate 1 along the rearward portion thereof. The bar is provided with left and right longitudinal slots 53 and 54 through which pass the shoulder screws 53' and 54', respectively threading into the short bosses 53'' and 54'' provided on upper surface of the base plate 1. The bar is thus free to slide laterally throughout the length of the slots 53 and 54. A side arm 52' at the right end of the bar 52 is turned up and pivotally connected to the lower end of a substantially vertically extending lever 57 (see Fig. 6) which is pivoted, at its central portion, on a turned over ear 58 provided on the bracket 44. The upper portion of the lever 57 is arranged to contact the left side of the locking arm 47. When the bar 52 is in its most rightward position (the bar being biased into such position by means of a tension spring 55 connected between a lug 56 on the bar and a pin 56' on the base plate 1) the lever 57 is positioned so that its upper portion is just free of the locking arm 47; when the bar 52 is moved into its leftward position, however, the lever 57 is rocked in a clockwise direction to cause the locking arm 47 to be moved rightwardly out of the path of the boss 51, thereby unlocking the end-gate.

At the left end of the bar 52 there is provided a hook 59 which is disposed in the path of the arm 19' on the carriage. As the carriage moves into its terminal position the carriage arm 19' contacts the hook 59 so as to move the bar 52 into its leftward position to unlock the end-gate. Thus when the carriage is in its terminal position, the resurfacing tool being then beyond the left end of the record, the end-gate is free to be opened, as for the removal of a record from the machine.

In order to insure that the carriage will be maintained in its terminal position while the end-gate is open, I provide a carriage locking means, which is rendered operative by the opening of the end-gate, for preventing a return of the carriage from its terminal position. These means comprise a bar 60 which overlies the bar 52 throughout the greater part of its length. This bar is mounted for sliding movement, as by the provision in the bar of left and right longitudinal slots 61 and 62 through which pass the aforementioned screws 53' and 54', these screws also passing through the respective spacers 61' and 62' (see Fig. 9) provided between the bars 52 and 60. The left end of the bar 60 is extended diagonally rearwardly and pivotally connected to a short rearward arm of a laterally extending lever 63, which is pivoted by a screw 64' on a stud 64 extending upwardly from the base plate 1. The bar 60 is normally resiliently retained in its most rightward position by means of a tension spring 65 connected between the bar and a pin 65' on the base plate 1. When the bar is so retained, the end portion 63' of the lever 63 which is opposite to the end connected with the bar 60, is in a rearward position free of the carriage arm 19'; however, when the bar 60 is moved leftwardly, the end portion 63' of the lever 63 is moved forwardly so that it will be to the right of the position occupied by the carriage arm 19' when the carriage is in its terminal position (this position of the arm 19' being shown in dash-dot lines in Fig. 1) to prevent a return of the carriage.

At the right end of the bar 60 there is provided an arm 66 which extends forwardly into the path described by the boss 51 on the end-gate. When the end-gate is opened, the boss 51 impinges against the arm 66 to move the bar 60 leftwardly and thereby to operate the carriage locking means just described. In order that the end-gate, when rendered free for opening movement, will swing outwardly into a fully open position to maintain the carriage locking means operative against the force of the spring 65, the end-gate is biased into open position by a relatively strong torsional spring 67. For suitably limiting the leftward movement of the bar 60, as the end-gate swings open, there may be provided a resilient pad 68 on the end of the rod 17 against which the arm 66 of the bar 60 may impinge.

The means for locking the record ejector in an unoperated position while the carriage is in other than its terminal position may be of a form as shown in Figs. 1, 7 and 8. These means comprise a rod 69 supported, for turning movement about its longitudinal axis, beneath the base plate 1 by front and back bosses 70 and 71 which project downwardly from the base plate 1. At the rearward end of the rod there is secured an arm 72 which projects upwardly, through an opening 72' in the base plate 1, so as to contact the left end of the bar 52, such contact being maintained by a torsional spring 73 which urges the arm 72 against the bar 52. At the forward end of the rod 69 there is secured an arm 74 which also projects upwardly above the base plate 1, as through an opening 75. At the upper end of the arm 74 there is provided a hook 74' which is arranged to engage a lateral pin 76 on the operating arm 32 of the record ejector so as to render the ejector inoperable. When the carriage 18 is out of its terminal position, the bar 52 being then in its most rightward position, the rod 69 is maintained in its most clockwise angular position by the spring 73. The hook 74' then overlies the pin 76 so as to lock the record ejector in its unoperated position. When the carriage 18 is in its terminal position, the bar 52 being then in its most leftward position, the rod 69 is maintained in a counter-clockwise position, by the contact of the bar 52 with the arm 72. The cook 74' then lies to the left of the pin 76 so as to render the record ejector operable.

The locking means for preventing the dislodgment of a record from operative position on the mandrel 9, while the carriage is in other than its terminal position, may be of a form as shown in Figs. 1, 2, 6 and 7. These means comprise a substantially rectangular plate 77 which is supported beneath the base plate 1, directly below the mandrel 9, for movement along the axis of the mandrel. The supporting means for the plate 77 may comprise three suitably staggered bosses 78 extending downwardly from the base plate 1 (see Figs. 2 and 7). In the plate 77 there are provided three similarly staggered slots 79, one for each of the bosses 78. Passing through the slots 79 and threading into the bosses 78 are the respective shoulder screws 80. Thus the plate 77 is slidably supported for to and fro movement, the path of travel of the plate being substantially parallel with the axis of the mandrel 9.

The plate 77 may be formed, as by stamping, so as to have a pair of turned down ears 81 separated by an opening 82, located at the right end of the plate substantially centrally with respect to its width. In the leftward portion of the plate 77 there is provided an elongated opening 83; at the right end of this opening, the plate is formed, again as by stamping, so as to have another pair of turned down ears 84 which may be in all respects similar to the ears 81. The pairs of ears, 81 and 84, are suitably apertured, to receive the respective shoulder screws 85 and 86. Pivoted on the shoulder screw 85 is a right-angle arm 87 which extends rightwardly and then upwardly of the plate 77, the arm 87 being provided with turned-down ears 81' through which the shoulder screw 85 passes. Pivoted on the shoulder screw 86 is a right angle arm 88, which is in all respects similar to the arm 87. The arm 88 extends leftwardly and then upwardly through the opening 83 of the plate 77. The arms 87 and 88 are biased downwardly by the light tension springs 89 and 90, the spring 89 being connected between a pin 89' on the plate 77 and a pin 89'' on the arm 87, and the spring 90 being connected between a pin 90' on the plate 77 and a pin 90'' on the arm 88. Downward swinging movement of the arms 87 and 88 is controlled and limited, however, by a bar 91 which is secured, by the screws 92' to the under side of the base plate 1. The bar 91 is disposed between the base plate and the plate 77, and is provided on its bottom surface with right and left cam faces 92 and 93 which are adapted to slidably contact respective short curved extensions 87' and 88' of the arms 87 and 88 so as to control the movement of these arms.

When the plate 77 is in its rightmost position, the leftward arm 88 slidably contacts a smooth horizontal surface 91' on the underside of the bar 91. By such contact the arm 88 is retained in its upward position, (see Fig. 6), wherein the arm projects upwardly through an opening 94 in the base plate and into the path described by a record in its mounting on the mandrel 9. The rightward arm 87 is, however, then in its downmost position, this position being defined by the contact of the curved extension 87' of the arm 87 with the cam surface 92. When the arm 87 is in its downmost position, it extends partially through an opening 95 in the base plate 1 to about even with the upper surface of the base plate. Thus in the mounting of a record on the mandrel 9, the record will clear the arm 87, but will encounter the end portion 88'' of the arm 88 so as to move the plate 77 leftwardly, as is illustrated in Fig. 6.

When a record has been partially mounted, the plate 77 is moved onwardly to the left, ahead of the record, by means of an over-center mechanism 149 comprising an arm 150 pivoted to a boss 151 extending downwardly from the base plate 1 and having a slot 152 engaging the pin 90' of the plate 77, the arm 150 being biased over center by a tension spring 153 connected between the arm and a pin 154 on the base plate. The plate 77 does not, however, move immediately into its most leftward position since the leftward movement of the plate 77 causes the rightward arm 87 to be moved upwardly, by reason of the contact of the extension 87' with the cam face 92 to bring its end portion 87'' into contact with the rightward end of the record. This contact of the arm 87 with the record limits the final leftward movement of the plate 77 so that the plate reaches its leftward position only when the record reaches a substantially fully mounted position with respect to the mandrel. The final leftward movement of the plate brings the extension 88' of the arm 88 into contact with the cam face 93, thereby permitting the arm 88 to be moved by the spring 90 downwardly out of contact with the record. When the plate 77 is in the end portion of its leftward travel, the rightward arm 87 is maintained in its upward position, as by the sliding contact of the arm 87 with a smooth horizontal surface 91'' on the underside of the bar 91. Before the record reaches a fully mounted position, the plate 77 is restricted in its leftward movement by the contact of the screws 80 with the slots 79 so that the terminal movement in mounting the record will render the record suitably free from the arm 87.

It is thus seen that in the mounting of a record on the mandrel, the plate 77 is moved leftwardly and the arm 88, which is encountered by the record during the mounting thereof, is swung downwardly free of the record, whereas the arm 87 is swung upwardly immediately to the right of the record. In the removal of a record from the mandrel, the plate 77 is moved rightwardly and the arm 87, which is encountered by the record after the record is moved a minute distance from a fully mounted position, is swung downwardly free of the record by the spring 89, whereas the arm 88 is swung upwardly so that it will be encountered in the remounting of a record on the machine. In order that the arms 87 and 88 may not be carried by inertia upwardly beyond their normal upward positions, as during an operation of quickly mounting or removing a record with respect to the mandrel 9, the plate 77 is provided with suitable right and left downwardly bent arms 96 and 97 against which the curved extensions 87' and 88' of the arms 87 and 88 may impinge upon to limit their upward swinging movements.

With the above arrangement, a record may be prevented from being removed from the mandrel 9 by the provision of means for locking the plate 77 in its leftward position, these locking means being inoperative when the carriage 18 is in its terminal position so that the record may then be removed from the mandrel. Such locking means for the plate 77 may suitably comprise a latching pawl 98 secured to the rod 69 and extending rightwardly thereof, as shown in Figs. 7 and 8. When the carriage is in its terminal position, the rod 69 is in a counter-clockwise angular position as abovementioned, the pawl 98 being then in an upward or unlatching position free of the plate 77; the plate 77 may then be moved rightwardly to permit the removal of a record from the mandrel. When the carriage is out of its terminal position, however, the rod 69 has been seen to be turned in a clockwise direction by the coil spring 73 (the ends of which may be hooked on the pawl 98 and boss 70 respectively); then the pawl 98 contacts the left edge of the opening 83 to lock the plate 77 against rightward movement, thereby preventing the removal of a record from the mandrel.

With an arrangement for preventing the removal of a record from the machine while the carriage is in other than its terminal position, there may be very desirably provided means for releasing the resurfacing tool from operative position as an incident of mounting a record on the machine. Upon completing the record mounting operation, the resurfacing tool may then be immediately reset with respect to the newly mounted record. In order that the carriage will not have to be returned from its terminal position to a position wherein the resurfacing tool will overlie the record, to permit such resetting of the tool, I provide a tool setting means of an improved form by which the tool may be very accurately and conveniently set into operative position while the carriage is in its terminal position; these tool setting means may now be described.

In order that the resurfacing tool may be set into operative position while the carriage is in its terminal position, wherein the tool is to the left of the record, there is employed a gauge which is offset to the right of the tool. After the tool is moved into an operative position and then locked therein, as by the operation of suitable tool-locking means, it is desirable to retract the gauge from the record so that the gauge may be suitably free of the record during the shaving operation. In order that the tool may be accurately moved into operative position, releasably locked in such position, and the gauge then retracted from the record by a single manipulation of the hand, I provide a tool setting lever which is resiliently retained in an unoperated position, the gauge then being also in an unoperated position; the tool-setting lever is coupled, however, to both the gauge and the resurfacing tool so that the gauge and tool are yieldably moved towards the record as the tool setting lever is moved into a terminal or operated position. The tool setting lever is moreover coupled to the tool locking means so that these locking means are rendered operative by the terminal movement of the tool setting lever; these locking means are, however, maintained in a locked or operative position upon the release of the tool-setting lever into an unoperated position, while the gauge is retracted from the record by such release. Thus, a movement of the tool-setting lever into an operated position will cause the tool to be locked in an operative position relative to the record, and the release of the tool-setting lever will cause the gauge to be retracted from the record, the tool remaining locked in its set position.

Figure 3:
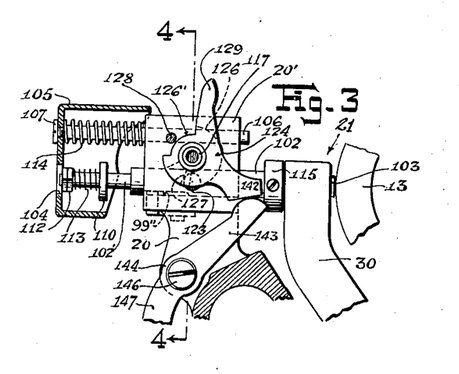
Fig. 3 is a partial left-hand elevational view of the mechanism for moving the resurfacing tool into and out of operative position with respect to the record, part of the mechanism being removed and other parts being shown in cross section for the better illustration of the mechanism.

The tool-setting means are mounted on the carriage extension 20. This extension is provided with the upper portion or head 20' which is substantially cubically shaped, as may be seen in Figs. 2, 3 and 9. The head 20' is provided with left and right openings 99 and 100 which are disposed in radial relationship with respect to the mandrel 9, and with another opening 101 which is disposed above and between the openings 99 and 100 in parallel relation thereto. Slidably passing through the leftward opening 99 is the resurfacing tool 21 comprising a knife bar 102 carrying a knife blade 103, suitably of sapphire, at its lower end, the knife bar 102 being restrained against turning by means of a key 99' fitting in a slot 20'' in the head 20' and slidably engaging a slot 99'' in the bar. The upper end portion 102' of the knife bar 102 is reduced in diameter; this portion 102' may pass through an enlarged opening 104 provided in the top of a cap 105 which fits slidably over the head 20'. The cap 105 is secured by a headed screw 107 to a guide rod 106 which slidably passes through the opening 101, as shown in Fig. 3. Slidably passing through the rightward opening 100 is a gauge bar 108. This gauge bar has a reduced-diameter portion 108' at its upper end which extends through an opening in the top of the cap 105, and which is provided with a headed screw 109 for limiting upward movement of the cap 105 with respect to the gauge.

Figure 5:
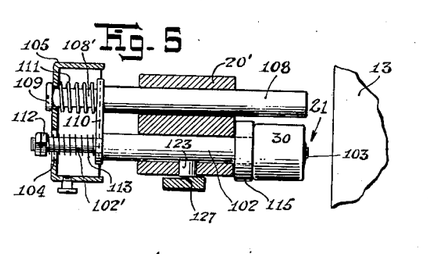
Fig. 5 is another cross sectional view of the tool mechanism, taken substantially along the line 5—5 of Fig. 4.

The gauge 108 is coupled to the knife bar 102 by means of a link bar 110 which is suitably secured to the gauge, as by a press fit on the reduced diameter portion 108', and which is provided with an aperture through which slidably passes the reduced-diameter portion 102' of the knife bar. Between the link 110 and the top of the cap 105 is a compression spring 111 which is coiled about the portion 108' of the gauge. Between the link 110 and an adjustable lock nut 112 on the upper end of the reduced-diameter portion 102' of the knife bar, is a relatively light compression spring 113 which is coiled about the portion 102' of the knife bar. Between the top of the head 20' and the top of the cap 105 is a compression spring 114 which is coiled about the guide rod 106. The spring 114 urges the cap 105 upwardly, and by reason of the restricted upward movement of the cap 105 with respect to the gauge 108, the gauge is also urged upwardly into an unoperated position. When the gauge 108 is in such unoperated position, the knife bar 102 is resiliently retained by the spring 113 in an inoperative position as shown in Fig. 5. The inoperative position of the knife bar 102 is defined by the abutment of a collar 115, provided on the lower end of the knife bar, with the underside of the head 20'. (Also provided on the lower end of the knife bar 102, below the collar 115, is the aforementioned chip chute 30.) It will be seen that the spring 114, which urges the cap 105 upwardly, will tend to compress the relatively light spring 113 since the knife bar 102 is limited in its upward movement by the collar 115. The spring 114 is adapted, however, to yieldably maintain the knife bar 102 in inoperative position but with insufficient force to cause any substantial compression of the spring 113.

Figure 4:
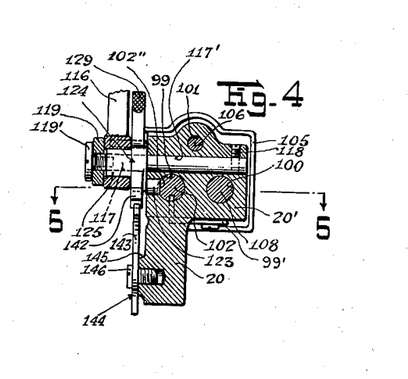
Fig. 4 is a cross sectional view of the tool mechanism, taken substantially along the line 4—4 of Fig. 3.

The resurfacing tool 21, which comprises the knife bar 102 and knife blade 103, is set into operative position with respect to a record mounted on the mandrel 9 by applying a downward movement to the cap 105. For applying such downward movement to the cap there is provided a tool-setting lever 116 which is pivotally supported by a post 117 provided on the left side of the head 20', the post being fitted in a lateral opening 117' provided in the head 20' and retained therein as by a screw 118 shown in Fig. 4. The lever is retained on the post 117 by means of a nut 119 and locking screw 119' and is connected with the cap 105 by means of a link 120. The link 120 is pivoted on the lever 116 by means of a pin 121, and on the left side of the cap 105 by means of a shoulder screw 122 which passes through a slot 122' in the link to thread into the side wall of the cap 105. Since the cap 105 is normally maintained in an upward or unoperated position by the spring 114, the lever 116 is likewise maintained in an unoperated position, this unoperated position of the lever being an upward position as shown in Fig. 2. A downward movement of the lever 116, from such upward position, will cause the cap 105 to be moved downwardly so as to move the gauge 108 and knife bar 102 towards the record. Such downward movement of the lever 116 may be suitably limited, by the abutment of the lower portion of the link 120 against the hub of the lever 116, this lower portion of the link being arcuately shaped so that it may conform to a portion of the hub.

As the cap 105 is moved downwardly by the lever 116, both the gauge 108 and knife bar 102 are yieldably moved downwardly by the spring 111. The knife bar 102 will normally not contact the record during the setting of the resurfacing tool since, in the normal operation of my invention, the resurfacing tool will be set into operative position while the carriage 18 is in its terminal position. The gauge 108, which is to the right of the resurfacing tool, will, however, contact the record to define the operative position of the resurfacing tool with respect to the record.

In order that the resurfacing tool may be not only moved into operative position but also locked in such position, by the downward swinging movement of the tool-setting lever 116, there is provided a tool-locking means which is rendered operative by the terminal movement of the tool-setting lever. This locking means comprises a pin 123 which is slidably mounted in the head 20' for transverse movement with respect to the direction of movement of the knife bar 102. The inner end of the pin 123 slidably contacts a flat 102'' on the knife bar 102, whereas the outer end projects slightly beyond the left side wall of the head 20'. On the post 117 there is pivoted a cam member 124 comprising a disc 126, located adjacent to the left side of the head 20' and having an open sector 126' of substantially 90°, and an integral sleeve 125 embracing the post 117 and conveniently serving as a bearing for the tool-setting lever 116. The inner wall of the disc 126, which is in counter-clockwise direction with respect to the open sector 126' as seen in Fig. 3, is suitably beveled to form a cam face 127. When the cam member 124 is turned in a clockwise direction, the cam face 127 slidably contacts the outer end of the pin 123 to press the pin tightly against the knife bar 102. Such movement of the cam member 124 is effected by the terminal movement of the tool-setting lever 116, as is now explained.

As the lever 116 is moved downwardly to set the resurfacing tool into operative position, a pin 128, carried by the lever 116 and extending into the sector 126', first traverses a portion of the open sector 126'; and then encounters the disc 126 so as to move the disc in a clockwise direction, thereby locking the resurfacing tool in its set position. As the lever 116 is released, it swings upwardly into its unoperated position, as by reason of the spring 114; the pin 128 on the lever 116 remains, however, free of the cam member 126 during such upward movement of the lever 116 and the cam member 124 remains in a tool-locking position as by reason of the friction between the pin 123 and the cam face 127. Thus the resurfacing tool 21 is maintained in its set position, as the lever 116 is returned to its unoperated position, but the gauge 108 is retracted from the record by reason of the contact of the upwardly biased cap 105 with the headed screw 109 on the gauge. Such retraction of the gauge causes the link bar 110 to slide upwardly along the reduced-diameter portion 102' of the knife bar 102, thereby causing a compression of the spring 113. Although this compression of the spring 113 retards the retraction of the gauge 108, the spring 114, which urges the cap 105 upwardly, is made sufficiently strong to effect such compression of the spring 113. By reason of this compression of the spring 113, the knife bar 102 is biased upwardly so that it will move into its inoperative position upon the release of the locking means which retained the tool in its operative position, such release being effected by turning the cam member 124 so as to free the pin 128 from the cam face 127. In the normal operation of my invention, the tool-locking means is released as an incident of mounting a record on the machine, but in order that the operator may release the resurfacing tool, at will, a fingerpiece 129 is provided on the disc 126.

It is common to manually move or press the gauge into contact with the record in the operation of setting the resurfacing tool. Although the gauge is normally provided with a relatively large surface for contacting the record, the operator may, as through inadvertence or inexperience, vary the pressure with which the gauge is pressed against the record through wide limits, thereby causing variations in the settings of the resurfacing tool with respect to the record. Such variations in the settings of the tool are particularly apt to occur on warm days when the record material is relatively soft, thereby allowing the gauge to be easily pressed down into the record. It will be seen, however, that with the above tool setting means, the resurfacing tool may be set into operative position, not only with great convenience but also with an unusually high degree of accuracy. The improved accuracy is achieved by the use of a tool setting gauge which is resiliently coupled to actuating means having a restricted range of movement. The provision of a resilient coupling between the cap 105 and the gauge 108, and of means for limiting the downward movement of the cap 105, as by the tool setting lever 116, cause the gauge to be pressed against the record with substantially even pressure for each setting of the tool, without any particular care being exercised on the part of the operator.

The tool-setting means having been so described, attention may now be directed to the means for releasing the tool from operative position. In order that the tool may be released as an incident of mounting a record on the machine, there is pivoted on the left end of the plate 77, as by a pivot screw 130, a leftwardly extending arm 131 having a V-shaped catch 131' at its left end. This arm is biased in a counter-clockwise direction by means of a tension spring 132, the counter-clockwise position of the arm being defined by the contact of a lug 133 on the arm with the left edge of the plate 77. As the plate 77 is moved leftwardly, the catch 131' abuts against a lug 134 provided on an arm 135 of a lever 136. This lever is pivoted on a boss 137 provided on the underside of the base plate 1, and is biased in a counter-clockwise direction against a stop 138 by means of a tension spring 139 connected between an ear 140 on an arm 141 of the lever and a pin 142 on the base plate 1. Thus when the plate 77 is moved leftwardly, as in the mounting of a record on the machine, the lever 136 is moved in a clockwise direction by the abutment of the catch 131' against the lug 134 on the lever 136. This movement of the lever 136 causes the lug 134 to move out of contact with the catch 131' so that the lever 136 will snap back against the stop 138 and behind the catch 131', as shown in Fig. 1, when the plate 77 nears its leftward position. The catch 131' does not, however, obstruct the rightward movement of the plate 77, as during the removal of a record from the machine, since the arm 131 is free to turn in a clockwise direction, as against the force of the spring 132, to permit the catch 131' to slide over the lug 134.

In order that the clockwise movement of the lever 136, which is incidental to the mounting of a record on the machine, may impart a counter-clockwise movement to the cam member 124 so as to free the cam face 127 from the pin 123 and thereby unlock the resurfacing tool, there is provided an arm 142 on the cam member 124 which is arranged to contact an arm 143 of a lever 144 that is pivoted, by a shoulder screw 146, on a boss 145 on the left side of the carriage extension 20, as shown in Fig. 3. The intermediate portion 147 of the lever 144 extends downwardly substantially in an arc about the carriage rod 17; the lower portion 148 of the lever 144 is turned over and extended substantially vertically downwardly through the opening 31 in the base plate 1. When the carriage is in its terminal position, the portion 148 of the lever 144 lies directly in front of the arm 141 of the lever 136. Thus, as a record is mounted on the mandrel 9, the clockwise movement imparted to the lever 136 causes the lever 144 on the carriage to be rocked in a counter-clockwise direction (see Fig. 2) so as to move the cam member 124 into a tool-unlocking position, thereby releasing the resurfacing tool from operative position. Since the tool-releasing means are normally unoperated and are momentarily operated only during the mounting of a record on the machine, as described above, it is seen that the resurfacing tool may be set at any time and that it will remain in such set position until a record is mounted on the machine, unless of course the operator should manually release the tool as by the fingerpiece 129.

Although I have described and illustrated my invention in a single embodiment, it will be understood that many other forms and modifications of the same may be employed without departing from the scope of my invention, which I now undertake to express according to the following claims:

I claim:

1. In a phonograph record shaving machine having means for supporting a record; in combination, a resurfacing tool movable along the record; means for preventing the removal of the record from the machine; and means, operative while said resurfacing tool is in a predetermined position with respect to the record, for rendering said preventing means inoperative.

2. In a phonograph record shaving machine having means for supporting a record to be resurfaced: in combination, a tool for resurfacing the record having both operative and inoperative ranges of movement; means for preventing the removal of the record from said record-supporting means; and means for rendering said preventing means operative and inoperative while said resurfacing tool is in the respective operative and inoperative ranges of its movement.

3. In a phonograph record shaving machine having a mandrel for supporting a record: in combination, an end-gate for said mandrel movable into supporting and non-supporting positions; a resurfacing tool movable along the record; means for locking said end-gate in a supporting position; and means, operative while said resurfacing tool is in a predetermined portion of its travel, for rendering said locking means inoperative.

4. In a phonograph record shaving machine having a record-supporting mandrel: in combination, an end-gate for said mandrel movable into supporting and non-supporting positions; a resurfacing tool movable across a record supported by said mandrel; locking means for said end gate; and means, operative when said resurfacing tool is in the end portion of its forward travel, for rendering said locking means inoperative.

5. In a phonograph record shaving machine having a mandrel for supporting a record to be resurfaced: in combination, a resurfacing tool movable with respect to the record supported by said mandrel; means for preventing movement of the record from a substantially fully mounted position with respect to said mandrel; and means, operative when said resurfacing tool is in a predetermined position with respect to the record, for rendering said preventing means inoperative.

6. In a phonograph record shaving machine having a mandrel for supporting a record to be resurfaced: in combination, a resurfacing tool movable across the record supported by said mandrel; means for obstructing a movement of the record from a substantially fully mounted position with respect to said mandrel; and means, automatically rendered operative as said resurfacing tool is moved into the end portion of its forward travel, for rendering said obstructing means inoperative.

7. In a phonograph record shaving machine having means for supporting a record to be resurfaced: in combination, a tool for resurfacing the record having both operative and inoperative ranges of movements; a record ejector; and means for rendering said ejector inoperable while said resurfacing tool is within said operative range of its movement.

8. In a phonograph record shaving machine having means for supporting a record: in combination, a carriage movable across the record into a terminal position; a record ejector; locking means for rendering said ejector inoperative; and means, inoperable when said carriage is in its terminal position, for rendering said locking means inoperative.

9. In a phonograph record shaving machine having means for supporting a record: in combination, a carriage movable across the record; a resurfacing tool on said carriage movable into operative position with respect to the record; and means, automatically operated incidental to the mounting of a record on the machine, for effecting a movement of said resurfacing tool out of operative position.

10. In a phonograph record shaving machine having means for supporting a record: in combination, a carriage movable across the record; a resurfacing tool on said carriage movable into operative position with respect to the record; and means, rendered operable when said carriage is in the end portion of its forward travel, for moving said resurfacing tool out of operative position as an incident of mounting a record on the machine.

11. In a phonograph record shaving machine having record supporting means: in combination; a movably mounted carriage having a terminal position; a resurfacing tool on said carriage movable into and out of operative position relative to a supported record; means for preventing both the mounting and removal of a record with respect to the machine when said carriage is in other than its terminal position; and means for moving said tool out of operative position incidental to the operation of mounting a record on the machine.

12. In a phonograph record shaving machine having a record-supporting mandrel: in combination, an end-gate for said mandrel; a carriage movable along said mandrel into a terminal position; locking means for said end-gate; means for rendering said locking means inoperative while said carriage is in its terminal position; and means for locking said carriage in said terminal position while said end-gate is open.

13. In a phonograph record shaving machine having record supporting means: in combination, a carriage movable relative to a supported record; means for preventing the removal of a record from the machine; means for locking said preventing means in operative position; means for rendering said locking means inoperative when said carriage is in a predetermined position; and means for locking said carriage in said predetermined position while said preventing means is out of said operative position.

14. In a phonograph record shaving machine having record supporting means: in combination, a carriage movable into a terminal position; a resurfacing tool on said carriage movable into and out of operative position relative to a supported record, said tool being beyond the record when said carriage is in its terminal position; means for obstructing the removal of a record from the machine; means for rendering said obstructing means inoperative when said carriage is in its terminal position; means for moving said tool out of operative position incidental to the operation of mounting a record on the machine; and offset means for determining the operative position of said resurfacing tool with respect to the record when said carriage is in said terminal position.

15. In a phonograph record shaving machine having a record-supporting mandrel: in combination, an end-gate for said mandrel movable into open and closed positions; a carriage movable along said mandrel; means for locking said carriage within a predetermined portion of its travel; and means for rendering said locking means inoperative as said end-gate is closed.

16. In a phonograph record shaving machine having means for supporting a record: in combination, a carriage movable across the record; a resurfacing tool on said carriage movable into and out of operative position relative to the record; means, operative when said carriage is in other than the end portion of its forward travel, for obstructing the removal of a record from the machine; means for locking said carriage in the end portion of its forward travel incidental to the removal of a record from the machine; and means for releasing said tool from operative position as an incident of mounting a record on the machine.

17. In a phonograph record shaving machine having means for supporting a record: in combination, a carriage movable across the record; means for obstructing the removal of a record from the machine, rendered inoperative when said carriage is in the end portion of its forward travel; and means, automatically operated incidental to the removal of a record from the machine, for locking said carriage in said end portion of its travel.

18. In a phonograph record shaving machine having means for supporting a record: in combination, a carriage movable into a terminal position beyond the record; a resurfacing tool on said carriage movable into and out of operative position relative to the record; means for locking said carriage in said terminal position incidental to the removal of a record from the machine; means, operative while said carriage is in said terminal position, for moving said tool out of operative position incidental to the mounting of a record on the machine; and means comprising an offset gauge for setting said resurfacing tool into operative position while said carriage is in its terminal position.

19. In a phonograph record shaving machine having means for supporting a record: in combination, a carriage movable into a terminal position beyond a supported record; a resurfacing tool on said carriage movable into and out of operative position relative to the record; means, operable while said carriage is in its terminal position, for moving said resurfacing tool out of operative position incidental to the mounting of a record on the machine; and means comprising an offset gauge for setting said resurfacing tool into operative position while said carriage is in its terminal position.

20. In a phonograph record shaving machine having means for supporting a record: in combination, a carriage movable across the record; a resurfacing tool on said carriage movable into and out of operative position relative to the record; means for locking said carriage in the end portion of its forward travel incidental to the removal of a record from the machine; and means for moving said resurfacing tool out of operative position incidental to the mounting of a record on the machine.

21. In a phonograph record shaving machine having record supporting means: in combination, a carriage; a resurfacing tool on said carriage; a gauge associated with said tool for predetermining the operative position of the resurfacing tool with relation to the record; tool-setting means comprising resilient means for yieldably moving said tool and said gauge towards the record; and resilient means for causing retraction of said gauge with respect to the record upon the release of the tool-setting means.

22. In a phonograph record shaving machine having record supporting means: in combination, a carriage; a resurfacing tool on said carriage; a gauge associated with said tool for predetermining the operative position of the resurfacing tool with relation to a supported record; manually operable tool-setting means comprising resilient means for yieldably moving both said tool and said gauge towards the record; means, operated by said tool-setting means, for locking said tool in operative position; and resilient means for causing retraction of said gauge with respect to the record upon the release of said tool-setting means.

23. In a phonograph record shaving machine having record supporting means: in combination, a carriage; a resurfacing tool on said carriage; a gauge associated with said tool for predetermining the operation position of the resurfacing tool with relation to the record; manually operable means comprising resilient means for yieldably moving both said tool and said gauge towards the record; tool-locking means; means for retracting said gauge with respect to the record upon the release of said manually operable means; and means for releasing the tool-locking means incidental to the operation of remounting a record on the machine.

24. In a phonograph record shaving machine having record supporting means: in combination, a carriage; a resurfacing tool on said carriage movable into operative position relative to the record; yieldable means for moving said tool into operative position; tool-locking means; and means for releasing said tool-locking means incidental to the operation of remounting a record on the machine.

25. In a phonograph record shaving machine having means for supporting a record: in combination; a resurfacing tool movable into operative position with respect to the record; a gauge associated with said tool; tool-setting means comprising resilient means for yieldably moving both said tool and said gauge towards the record; tool-locking means operated incidental to the operation of said tool-setting means; means for retracting said gauge from the record incidental to the return of said tool-setting means to unoperated position; and manual means for releasing said tool-locking means.

26. In a phonograph record shaving machine having a record-supporting mandrel: the combination of an end-gate for said mandrel movable into supporting and non-supporting positions; a tool-carriage movable along said mandrel; means for locking said end-gate in a supporting position; means for normally rendering said locking means operative; and means, controlled by said tool-carriage, for rendering said locking means inoperative.

27. In a phonograph record shaving machine having a record-supporting mandrel: in combination, an end-gate for said mandrel movable into open and closed positions; a carriage movable along said mandrel; and means, controlled by said end-gate, for locking said carriage within a predetermined portion of its travel.

28. In a phonograph record shaving machine having a record-supporting mandrel: in combination, an openable and closeable end-gate for said mandrel; a carriage movable along said mandrel into a terminal position; and means, operated by said end-gate as the end-gate is opened, for locking said carriage in said terminal position.

29. In a phonograph record shaving machine having a support on and from which a record may be mounted and removed: the combination of a tool-carriage movable relative to said support; means for locking said carriage within a predetermined portion of its travel; and means for causing said locking means to be rendered inoperative by the mounting of a record on the machine.

30. In a phonograph record shaving machine having a record support: in combination, a tool-carriage movable relative to said support; means for locking said carriage within a predetermined portion of its travel; and means, automatically operated incidental to the removal of a record from the machine, for rendering said locking means operative.

31. In a phonograph record shaving machine having a support on and from which a record may be mounted and removed: in combination, a tool-carriage movable relative to said support; and means, controlled by said tool-carriage, for preventing both the mounting and removal of a record with respect to the machine while said tool-carriage is in a predetermined portion of its travel.

32. In a phonograph record shaving machine having a support on and from which a record may be mounted and removed: the combination of a tool-carriage movable relative to said support; means, effective when said tool-carriage is in other than a predetermined portion of its travel, for preventing the removal of a record from the machine; means, rendered effective incidental to the removal of a record from the machine, for locking said tool-carriage in said predetermined portion of its travel; and means, operated as an incident to the act of mounting a record on the machine, for rendering said carriage-locking means ineffective.

RICHARD M. SOMERS.

CERTIFICATE OF CORRECTION.

Patent No. 2,209,833. July 30, 1940.

RICHARD M. SOMERS.

It is hereby certified that error appears in the printed specification of the above numbered patent requiring correction as follows: Page 2, second column, line 34, for "postion" read --position--; page 4, second column, line 5, for the word "cook" read --hook--; page 8, first column, line 60, claim 7, for "movements" read --movement--; line 68-69, claim 8, for "inoperative" read --inoperable--; line 69, same claim, for "inoperable" read --operative--; page 9, first column, line 15, claim 17, for "obstructiong" read --obstructing--; and that the said Letters Patent should be read with this correction therein that the same may conform to the record of the case in the Patent Office.

Signed and sealed this 29th day of October, A. D. 1940.

(Seal)

Henry Van Arsdale,
Acting Commissioner of Patents.